US012449752B2

(12) United States Patent
Kunimi et al.

(10) Patent No.: US 12,449,752 B2
(45) Date of Patent: Oct. 21, 2025

(54) PRINTING SYSTEM, PRINTING METHOD, AND COMPUTER-READABLE MEDIUM

(71) Applicants: Keiji Kunimi, Kanagawa (JP); Ryo Kobayashi, Kanagawa (JP)

(72) Inventors: Keiji Kunimi, Kanagawa (JP); Ryo Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/675,176

(22) Filed: May 28, 2024

(65) Prior Publication Data

US 2024/0402639 A1 Dec. 5, 2024

(30) Foreign Application Priority Data

Jun. 2, 2023 (JP) ................................ 2023-091983

(51) Int. Cl.
*G03G 15/00* (2006.01)

(52) U.S. Cl.
CPC ..... *G03G 15/5062* (2013.01); *G03G 15/5016* (2013.01)

(58) Field of Classification Search
CPC ........... G03G 15/5016; G03G 15/5062; H04N 1/6052
See application file for complete search history.

(56) References Cited

U.S. PATENT DOCUMENTS

| | | | | |
|---|---|---|---|---|
| 8,283,004 | B2 * | 10/2012 | Bala | B41M 3/144 428/29 |
| 2005/0135856 | A1 * | 6/2005 | Uchida | H04N 1/00883 399/411 |
| 2020/0081669 | A1 | 3/2020 | Kunimi et al. | |
| 2020/0336603 | A1 | 10/2020 | Kobayashi | |
| 2020/0336622 | A1 | 10/2020 | Kunimi et al. | |
| 2020/0412908 | A1 | 12/2020 | Kobayashi | |
| 2020/0412916 | A1 * | 12/2020 | Kobayashi | G03G 15/6585 |
| 2022/0201153 | A1 | 6/2022 | Kobayashi | |

FOREIGN PATENT DOCUMENTS

| | | | |
|---|---|---|---|
| JP | 2013-168795 | A | 8/2013 |
| JP | 2021-004957 | A | 1/2021 |
| JP | 2021-005365 | A | 1/2021 |
| JP | 2022-170951 | A | 11/2022 |

* cited by examiner

*Primary Examiner* — Hoang X Ngo
(74) *Attorney, Agent, or Firm* — XSENSUS LLP

(57) ABSTRACT

An electrophotographic printing system includes circuitry configured to: select, in accordance with an operation to an input device, a mask pattern made up of first toner representing black by a combination of a plurality of color toners, the mask pattern being overlaid on an image area of a target image to be concealed within image data; and generate, based on the image data, print data for overlaying and printing the selected mask pattern on the image area.

11 Claims, 13 Drawing Sheets

| | ONE PRINTED | ONE COPIED | IR IMAGE OF ONE COPIED | IR IMAGE OF ONE PRINTED | SEEN WITH IR CAMERA? |
|---|---|---|---|---|---|
| ONLY QR CODE |  |  |  |  | ONE PRINTED: ○<br>ONE COPIED: ○ |
| PRINT QR CODE WITH BLACK TONER AND PRINT ANOTHER PORTION WITH CMY TONER (SOLID) |  |  |  |  | ONE PRINTED: ○<br>ONE COPIED: × |
| PRINT QR CODE WITH BLACK TONER AND PRINT ANOTHER PORTION WITH CMY TONER (PATTERN) |  |  |  |  | ONE PRINTED: ○<br>ONE COPIED: × |

FIG.7

```
[
    {
        "src x":  "100",
        "src y":  "100",
        "width":  "200",
        "height": "200",
        "pattern":  "001",
    }
    {
        "src_x":  "500",
        "src_y":  "500",
        "width":  "700",
        "height": "800",
        "pattern":  "003",
    }
]
```

FIG.8

```
@RPCS SRC1_X=100
@RPCS SRC1_Y=100
@RPCS SRC1_WIDTH=200
@RPCS SRC1_HEIGHT=200
@RPCS PATTERN1=001
@RPCS SRC2_X=500
@RPCS SRC2_Y=500
@RPCS SRC2_WIDTH=700
@RPCS SRC2_HEIGHT=800
@RPCS PATTERN1=003
...
(PRINT DATA OF DOCUMENT)
```

(a) 10 POINTS (b) 14 POINTS (c) 16 POINTS (d) COMBINE 10, 14, AND 16 POINTS (a) PRINTING RATE 60% (SINGLE COLOR 20%) (b) PRINTING RATE 120% (SINGLE COLOR 40%) (c) PRINTING RATE 180% (SINGLE COLOR 60%) (d) PRINTING RATE 240% (SINGLE COLOR 80%)

PRINTING SYSTEM, PRINTING METHOD, AND COMPUTER-READABLE MEDIUM

CROSS-REFERENCE TO RELATED APPLICATIONS

The present application claims priority under 35 U.S.C. § 119 to Japanese Patent Application No. 2023-091983, filed on Jun. 2, 2023. The contents of which are incorporated herein by reference in their entirety.

BACKGROUND OF THE INVENTION

1. Field of the Invention

The present invention relates to a printing system, a printing method, and a computer-readable medium.

2. Description of the Related Art

There are many cases where personal information such as an individual number, a bank account, and an address is entered to apply for various applications and procedures, and this brings a social problem such as the leakage of personal information. "Personal Information Protection Law" aimed at protecting individual rights and interests while considering the usability of personal information establishes common rules that should be followed by not only national administrative agency, independent administrative agency, local government, etc., but also all business operators and organizations that handles personal information.

A written document etc. for carrying out various applications and procedures is created as data by a personal computer etc. and is printed to be submitted in many cases. Much personal and confidential information etc. are described in such the written document etc., but this is not preferable from the point of view of the protection of personal information because a third party can simply see this information by looking into the written document.

For that reason, as a technology of hiding personal information etc. such that it cannot be visually determined, there is disclosed a technology of performing an isochromatic masking process on an image to be embedded (latent image to be hidden) and a background image to hide this image to be embedded (e.g., Japanese Unexamined Patent Application Publication No. 2021-004957).

However, in the technology disclosed in Japanese Unexamined Patent Application Publication No. 2021-004957, it is necessary to perform a complicated calculation process called the isochromatic masking process on the image to be embedded (latent image to be hidden) and the background image, and thus there is a problem that the color of the image to be embedded becomes lighter than before the calculation process.

SUMMARY OF THE INVENTION

According to one aspect of the present invention, an electrophotographic printing system includes circuitry configured to: select, in accordance with an operation to an input device, a mask pattern made up of first toner representing black by a combination of a plurality of color toners, the mask pattern being overlaid on an image area of a target image to be concealed within image data; and generate, based on the image data, print data for overlaying and printing the selected mask pattern on the image area.

BRIEF DESCRIPTION OF THE DRAWINGS

FIG. 7 is a diagram illustrating an example of area information data;

FIG. 8 is a diagram illustrating an example of print data output from a print driver;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
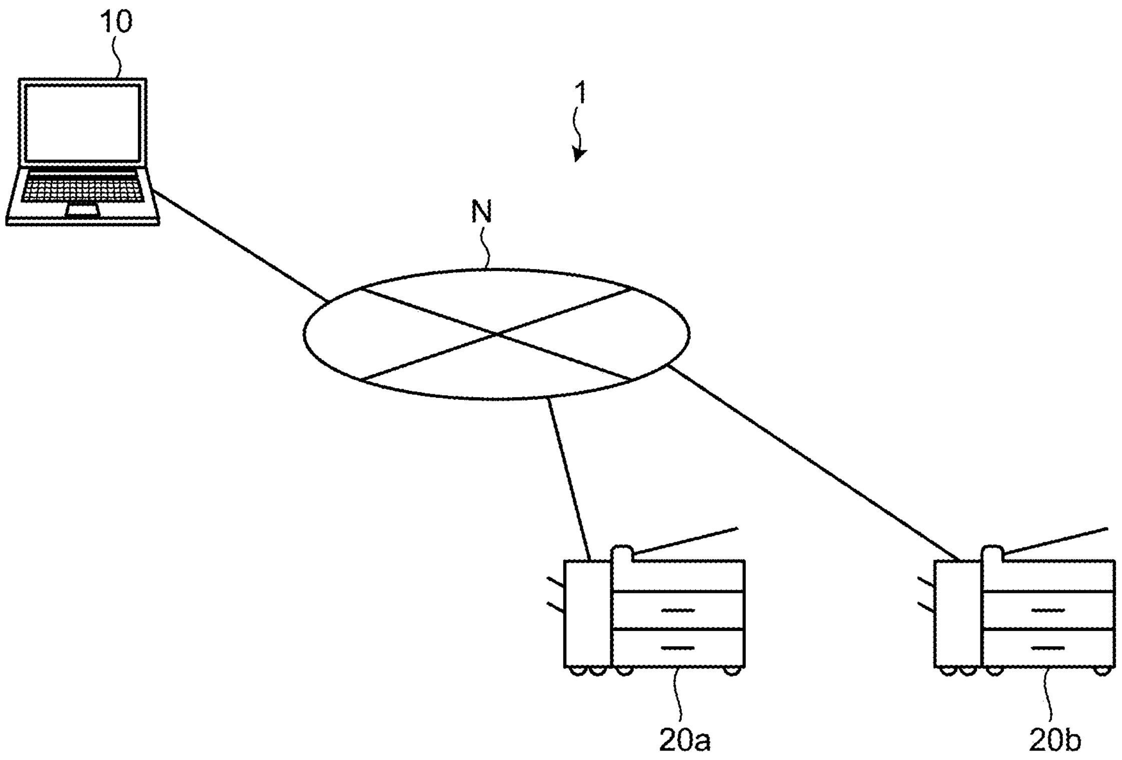
FIG. 1 is a diagram illustrating an example of an overall configuration of an image forming system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a printing system, a printing method, and a computer-readable medium, which can hide an image to be hidden by a simple process and read this image by an infrared reader.

An embodiment of a printing system, a printing method, and a computer-readable medium according to the present invention will be described in detail below with reference to the accompanying drawings. Moreover, the present invention is not limited to the following embodiment, and components in the following embodiment include ones easily conceived by those skilled in the art, substantially the same ones, and so-called equivalents. Furthermore, various omissions, substitutions, changes, and combinations of the components can be made without departing from the spirit of the following embodiment.

Overall Configuration of Image Forming System

FIG. 1 is a diagram illustrating an example of an overall configuration of an image forming system 1 according to an embodiment. The overall configuration of the image forming system 1 according to the present embodiment will be described with reference to FIG. 1.

The image forming system 1 illustrated in FIG. 1 is a system that performs printing (image forming) on data (hereinafter, referred to as image data) that includes a document and an image created by an application of an information processing device 10 in a state where an image portion that need to be concealed included in the image data is hidden by a mask pattern. As illustrated in FIG. 1, the image forming system 1 includes the information processing device 10 and image forming devices 20*a* and 20*b*. These devices can communicate with each other via a network N. The network N is the LAN (local area network), the Internet, or the like, for example, and may include any of a wired network and a wireless network.

The information processing device 10 is an information processing device, such as a PC (personal computer), a workstation, a smartphone, and a tablet terminal, which performs setting of hiding with a mask pattern an image portion of an image area (hidden area) specified by the function of a print driver with respect to the image data created by the application.

Note that the one information processing device 10 is illustrated in the example illustrated in FIG. 1 but the number of devices is not limited to one.

Each of the image forming devices 20*a* and 20*b* is a device such as an electrophotographic MFP (multifunction peripheral) that executes hidden printing by which the mask pattern set by the information processing device 10 is overlaid and printed on the image portion of the specified hidden area. Moreover, each of the image forming devices 20*a* and 20*b* performs printing on a printing medium by using toner color material of K (black) such as carbon black indicating infrared absorption and toner color material of colors of C (cyan), M (magenta), and Y (yellow) indicating infrared transparency or infrared reflection characteristic.

Note that two image forming devices of the image forming devices 20*a* and 20*b* are illustrated in the example illustrated in FIG. 1 but the number of devices is not limited to two. Moreover, when the image forming devices 20*a* and 20*b* indicate an arbitrary image forming device or are collectively referred to, these devices are simply referred to as "the image forming device 20".

Hardware Configuration of Information Processing Device

Figure 2:
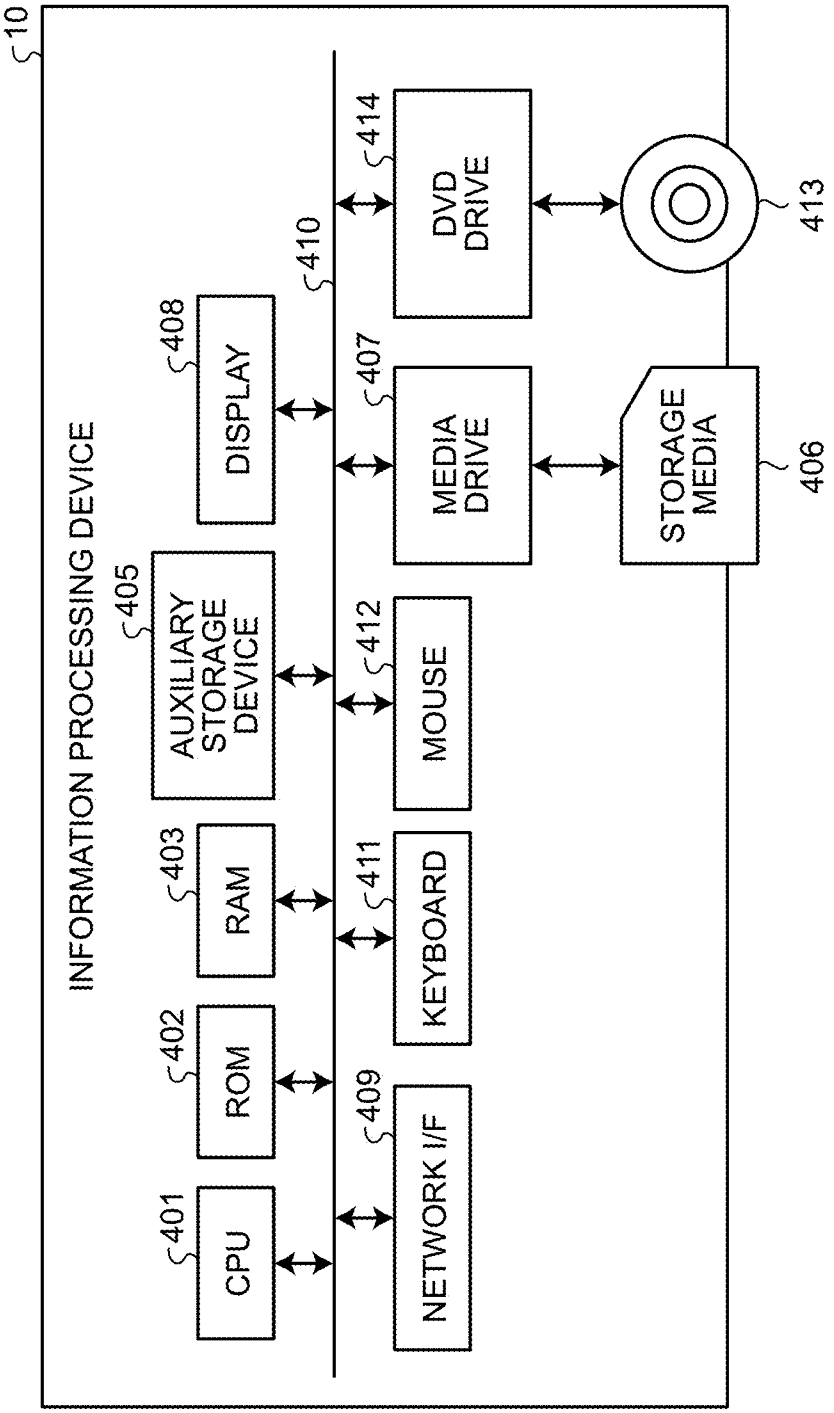
FIG. 2 is a diagram illustrating an example of a hardware configuration of an information processing device according to the embodiment.

FIG. 2 is a diagram illustrating an example of a hardware configuration of the information processing device 10 according to the embodiment. The hardware configuration of the information processing device 10 according to the present embodiment will be described with reference to FIG. 2.

As illustrated in FIG. 2, the information processing device 10 includes a CPU (central processing unit) 401, a ROM (read only memory) 402, a RAM (random access memory) 403, an auxiliary storage device 405, a media drive 407, a display 408, a network I/F 409, a keyboard 411, a mouse 412, and a DVD (digital versatile disc) drive 414.

The CPU 401 is a calculation device that controls operations of the entire information processing device 10. The ROM 402 is a nonvolatile storage that stores therein a program for the information processing device 10. The RAM 403 is a volatile storage that is used as a work area of the CPU 401.

The auxiliary storage device 405 is a storage device, such as an HDD (hard disk drive) and an SSD (solid state drive), which stores therein various data, programs, and the like. The media drive 407 is a device that controls reading and writing of data from and to a storage media 406 such as a flash memory in accordance with the control of the CPU 401.

The display 408 is a display device, made of liquid crystal or organic electro-luminescence, which displays various types of information such as cursor, menu, window, character, and image.

The network I/F 409 is an interface that performs data communication with an external device such as the image forming device 20 via the network N. The network I/F 409 corresponds to Ethernet (registered trademark), for example, and is a network interface card (NIC) etc. by which wired or wireless communication based on TCP (transmission control protocol), IP (internet protocol), etc. can be performed.

The keyboard 411 is an input device that performs the selection of character, numeric character, various instructions, the movement of cursor, and the like. The mouse 412 is an input device that performs the selection and execution of various instructions, the selection of processing target, the movement of cursor, and the like.

The DVD drive 414 is a device that controls reading and writing of data from and to a DVD 413 such as DVD-ROM and DVD-R (digital versatile disk recordable) acting as an example of a removable storage medium.

The CPU 401, the ROM 402, the RAM 403, the auxiliary storage device 405, the media drive 407, the display 408, the network I/F 409, the keyboard 411, the mouse 412, and the DVD drive 414 described above are connected by a bus line 410 such as an address bus and a data bus to be able to communicate with one another.

Note that the hardware configuration of the information processing device 10 illustrated in FIG. 2 illustrates an example and thus may not require to include all the components illustrated in FIG. 2 or may include other components.

Hardware Configuration of Image Forming Device

Figure 3:
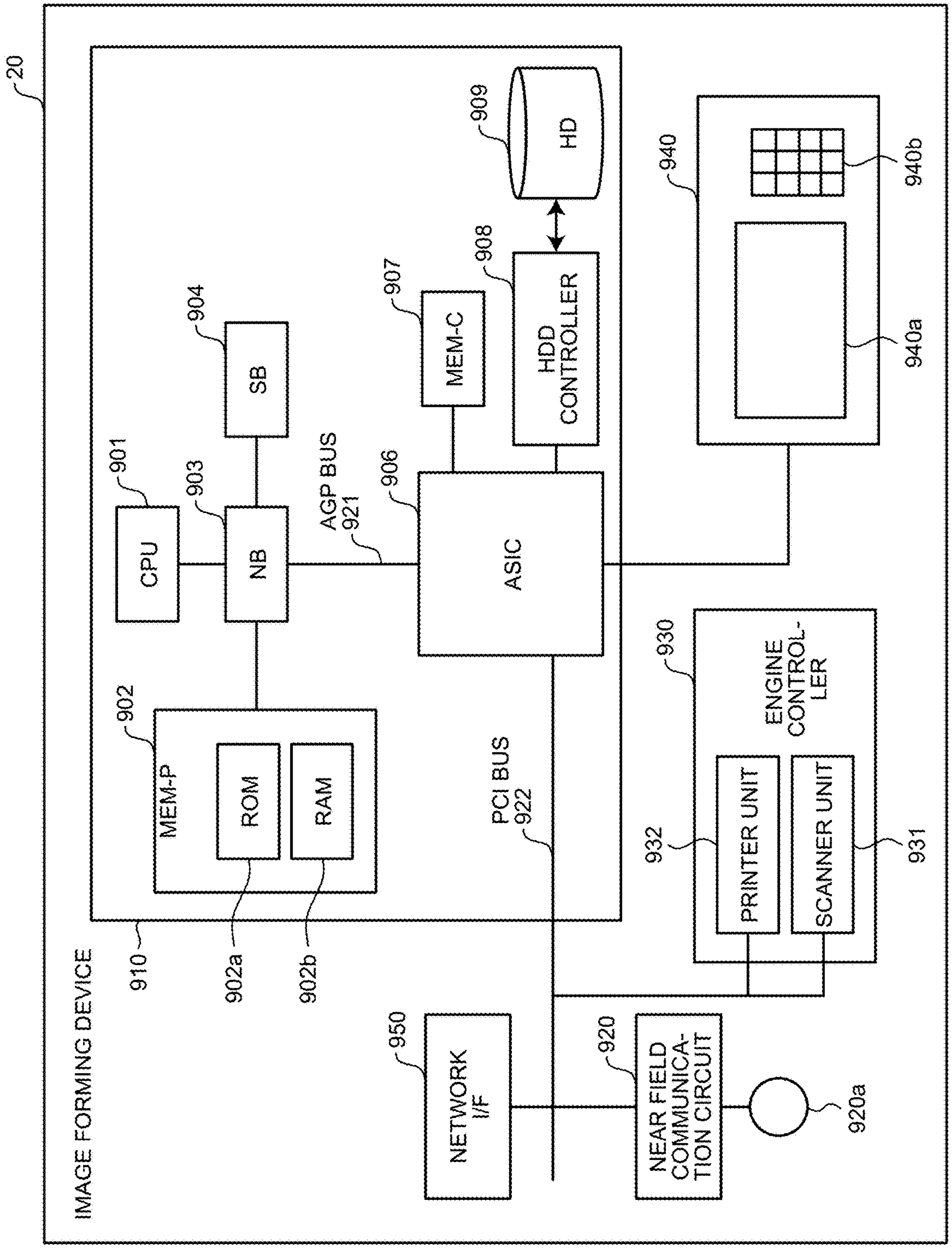
FIG. 3 is a diagram illustrating an example of a hardware configuration of an image forming device according to the embodiment.

FIG. 3 is a diagram illustrating an example of a hardware configuration of the image forming device 20 according to the embodiment. The hardware configuration of the image forming device 20 according to the present embodiment will be described with reference to FIG. 3.

As illustrated in FIG. 3, the image forming device 20 includes a controller 910, a near field communication circuit 920, an engine controller 930, an operation panel 940, and a network I/F 950.

The controller 910 includes a CPU 901, an MEM-P (system memory) 902, an NB (north bridge) 903, an SB (south bridge) 904, an ASIC (application specific integrated circuit) 906, an MEM-C (local memory) 907, an HDD controller 908, and an HD 909, which are main components of a computer. Among them, the NB 903 and the ASIC 906 are connected by an AGP (accelerated graphics port) bus 921.

The CPU 901 is a calculation device that totally controls the image forming device 20. The NB 903 is a bridge for connecting the CPU 901, the MEM-P 902, the SB 904, and the AGP bus 921, and includes a PCI (peripheral component interconnect) master, an AGP target, and a memory controller that controls reading and writing for the MEM-P 902.

The MEM-P 902 includes: a ROM 902*a* that is a storing memory of a program and data realizing each function of the controller 910; and a RAM 902*b* that is used as a memory for expanding a program and data, a drawing memory when memory printing, and the like. Note that a program stored in the RAM 902*b* may be configured to be recorded and provided in a computer-readable recording medium such as a CD-ROM (compact disc read only memory), a CD-R (compact disc recordable), and a DVD in an installable or executable format.

The SB 904 is a bridge for connecting the NB 903 and "a PCI device, a peripheral device, and the like". The ASIC 906 is an IC (integrated circuit) for image processing applications including hardware elements for image processing, and has a role of a bridge that connects the AGP bus 921, a PCI bus 922, the HDD controller 908, and the MEM-C 907. The ASIC 906 includes a PCI target, an AGP master, an arbiter (ARB) forming a core of the ASIC 906, a memory controller controlling the MEM-C 907, a plurality of DMACs (direct memory access controller) performing rotation etc. of image data by hardware logic etc., and a PCI unit performing data transfer via the PCI bus 922 between a scanner unit 931 and a printer unit 932. Note that an interface of a USB (universal serial bus) or an interface of IEEE 1394 (Institute of Electrical and Electronics Engineers 1394) may be connected to the ASIC 906.

The MEM-C 907 is a local memory that is used as an image buffer for copy and a code buffer. The HD 909 is a storage that performs the accumulation of image data, the accumulation of font data to be used during printing, and the accumulation of form. The HDD controller 908 is a controller that controls the reading or writing of data for the HD 909 in accordance with the control of the CPU 901. Note that the HDD controller 908 and the HD 909 may be SSDs.

The AGP bus 921 is a bus interface for a graphics accelerator card suggested to speed up graphic processing, and can speed up the graphics accelerator card by directly accessing the MEM-P 902 at high throughput.

The near field communication circuit 920 is a communication circuit such as NFC (near field communication) and Bluetooth (registered trademark). The near field communication circuit 920 is electrically connected to the ASIC 906 via the PCI bus 922. An antenna 920*a* for wireless communication is connected to the near field communication circuit 920.

The engine controller 930 includes the scanner unit 931 and the printer unit 932. The scanner unit 931 and the printer unit 932 have an image processing function such as error diffusion and gamma conversion.

The operation panel 940 includes: a panel display 940*a* such as a touch panel, which displays thereon a current setting value, a selection screen, and the like to accept the input from a user; and a hard key 940*b* that includes a numeric keypad accepting a set value of a condition for image forming such as a setting condition of concentration, a start key accepting a copy start instruction, and the like.

Note that the image forming device 20 can sequentially switch modes between a document box function, a copy function, a printer function, and a fax function to select one of them by a switch key of an application of the operation panel 940. The mode is a document box mode when selecting the document box function, is a copy mode when selecting the copy function, is a printer mode when selecting the printer function, and is a fax mode when selecting the fax function.

The network I/F 950 is an interface that performs data communication via the network, and is a communicatable interface based on the Ethernet, TCP/IP, etc., for example. The network I/F 950 is electrically connected to the ASIC 906 via the PCI bus 922.

Note that the hardware configuration of the information processing device constituting the image forming device 20 illustrated in FIG. 3 illustrates an example, and may not include all the components illustrated in FIG. 3 or may include other components.

Operation Overview of Image Forming System

Figure 4:
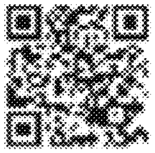
FIG. 4 is a diagram explaining a comparative example between one printed, one copied, and IR images.
Figure 4:
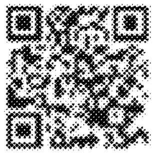
Figure 4:
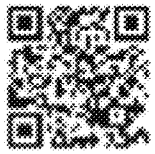
Figure 4:
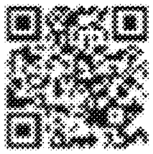
Figure 4:
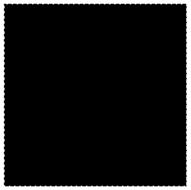
Figure 4:
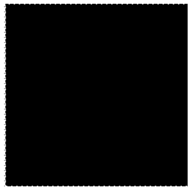
Figure 4:
Figure 4:
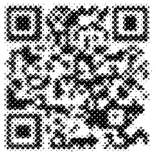
Figure 4:
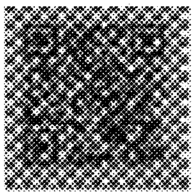
Figure 4:
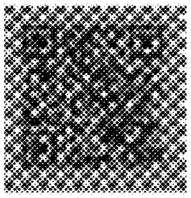
Figure 4:
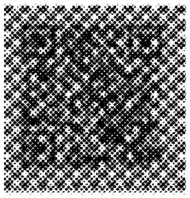
Figure 4:
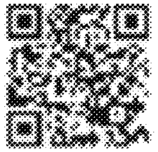

FIG. 4 is a diagram explaining a comparative example between one printed, one copied, and IR images. The overview of operations of the image forming system 1 according to the present embodiment will be described with reference to FIG. 4.

An electrophotographic image forming device (e.g., laser printer) uses toner as color materials. Among them, a toner color material (hereinafter, may be referred to as black toner) of black (K) such as carbon black has a property absorbing infrared (IR). Therefore, because a print area drawn with black toner on a printing medium absorbs infrared incident from the outside, an infrared reader such as an infrared camera or an infrared scanner detects (recognizes) infrared from this print area as black. On the other hand, a toner color material (hereinafter, may be referred to as color toner) of colors of C (cyan), M (magenta), and Y (yellow) has a property transmitting or reflecting infrared. Therefore, in a print area drawn with color toner on the printing medium, infrared incident from the outside transmits or reflects this color toner, and thus the infrared reader detects infrared from this print area. As a result, when the area drawn with black toner and the area drawn with black formed by overlaying of color toners of C, M, and Y are mixed, the infrared reader can read an area drawn with black toner absorbing infrared as an image. By using this principle, an image such as a two-dimensional code such as a QR code (registered trademark) and characters for personal information such as a name and an address is drawn with black toner (second toner), and an image is formed by overlaying and drawing black formed by overlaying (combination) of color toners (cyan toner, magenta toner, and yellow toner) of C, M, and Y on the drawing area, and thus human eyes cannot see a black toner image and the image to be read by only the infrared reader can be formed.

Herein, as illustrated in FIG. 4, there are compared one (hereinafter, referred to as QR code image) obtained by printing only the QR code with black toner, one (hereinafter, referred to as solid image) obtained by printing the QR code with black toner and printing a rectangular area including the entire QR code with black (solid) formed by overlaying of color toners of C, M, and Y, and one (hereinafter, referred to as pattern image) obtained by printing the QR code with black toner and printing the rectangular area including the entire QR code with a black dot pattern formed by overlaying of color toners of C, M, and Y.

For example, when copying the QR code image, the image is detected and processed with visible rays, and one obtained by printing the QR code itself is output as illustrated in FIG. 4. Moreover, because any of the QR code image and the image obtained by copying it have a QR code portion drawn with black toner, an image (IR image) obtained by reading any image by the infrared reader can be also read as a QR code as illustrated in FIG. 4.

Moreover, when copying the solid image, because the image is detected and processed with visible rays, one printed entirely with black is output as illustrated in FIG. 4. However, because the one printed is entirely drawn with black toner, the QR code cannot be read even if the reading is performed by the infrared reader as illustrated in FIG. 4 ("IR image of one copied"). On the other hand, when reading the QR code image by the infrared reader, the QR code can be read based on the principle described above as illustrated in FIG. 4 ("IR image of one printed").

Finally, when copying the pattern image, because the image is detected and processed with visible rays, an image similar to the pattern image is output as illustrated in FIG. 4. Moreover, because the output one is entirely drawn with black toner, the QR code cannot be read by a dot pattern even if the reading is performed by the infrared reader as illustrated in FIG. 4 ("IR image of one copied"). On the other hand, when reading the pattern image by the infrared reader, the QR code can be read based on the principle described above as illustrated in FIG. 4 ("IR image of one printed").

As described above, for the solid image, the pattern image, and ones obtained by copying these, a human being cannot recognize a QR code as a visible image, and further the QR code cannot be read even if one copied is read by the infrared reader. Therefore, because human eyes cannot see the QR code for the solid image and the pattern image acting as original print and the human eyes as well as the infrared reader cannot read the QR code for ones obtained by copying these, the information leakage of the QR code can be suppressed.

In this regard, however, because printing is performed with solid toner over the entire print area in the case of the solid image, there are a problem that fixing property of toner is impaired and a problem that the QR code formed of black toner is slightly visible by a subtle difference in characteristics between black by black toner and black formed by overlaying of color toners of C, M, and Y. Therefore, in the present embodiment, like the above pattern image illustrated in FIG. 4, an image such as a two-dimensional code such as a QR code and characters for personal information such as a name and an address can be concealed by overlaying a mask pattern such as a black dot pattern formed by overlaying of color toners (example of first toner) of C, M, and Y on the code or the image, and can be read by the infrared reader. This can be realized by applying a technology for background pattern printing included in the conventional printer driver, for example. For example, a mechanism of background pattern printing is to overlay and print a specific pattern (background pattern) separately from an original printing target, select the type of this specific pattern, and specify an area in which this specific pattern is printed. The mechanism of background pattern printing can be applied to printing the mask pattern according to the present embodiment.

Note that the mask pattern is not limited to one formed by overlaying of color toners of C, M, and Y, and a combination of what kind of color toners may be applied if the overlaying is a combination of color toners (first toner) that can indicate at least infrared transparency and represent black.

Configuration and Operations of Functional Blocks of Image Forming System

Figure 5:
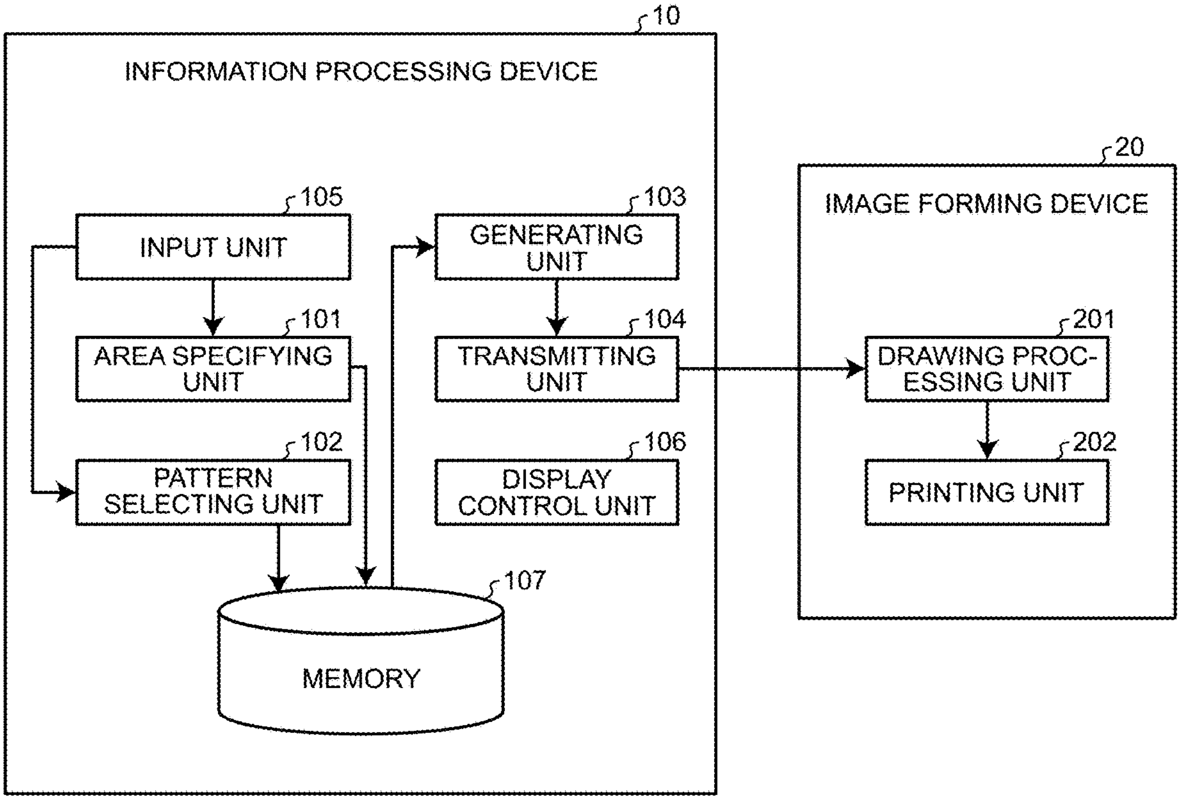
FIG. 5 is a diagram illustrating an example of a functional block configuration of the image forming system according to the embodiment.
Figure 6:
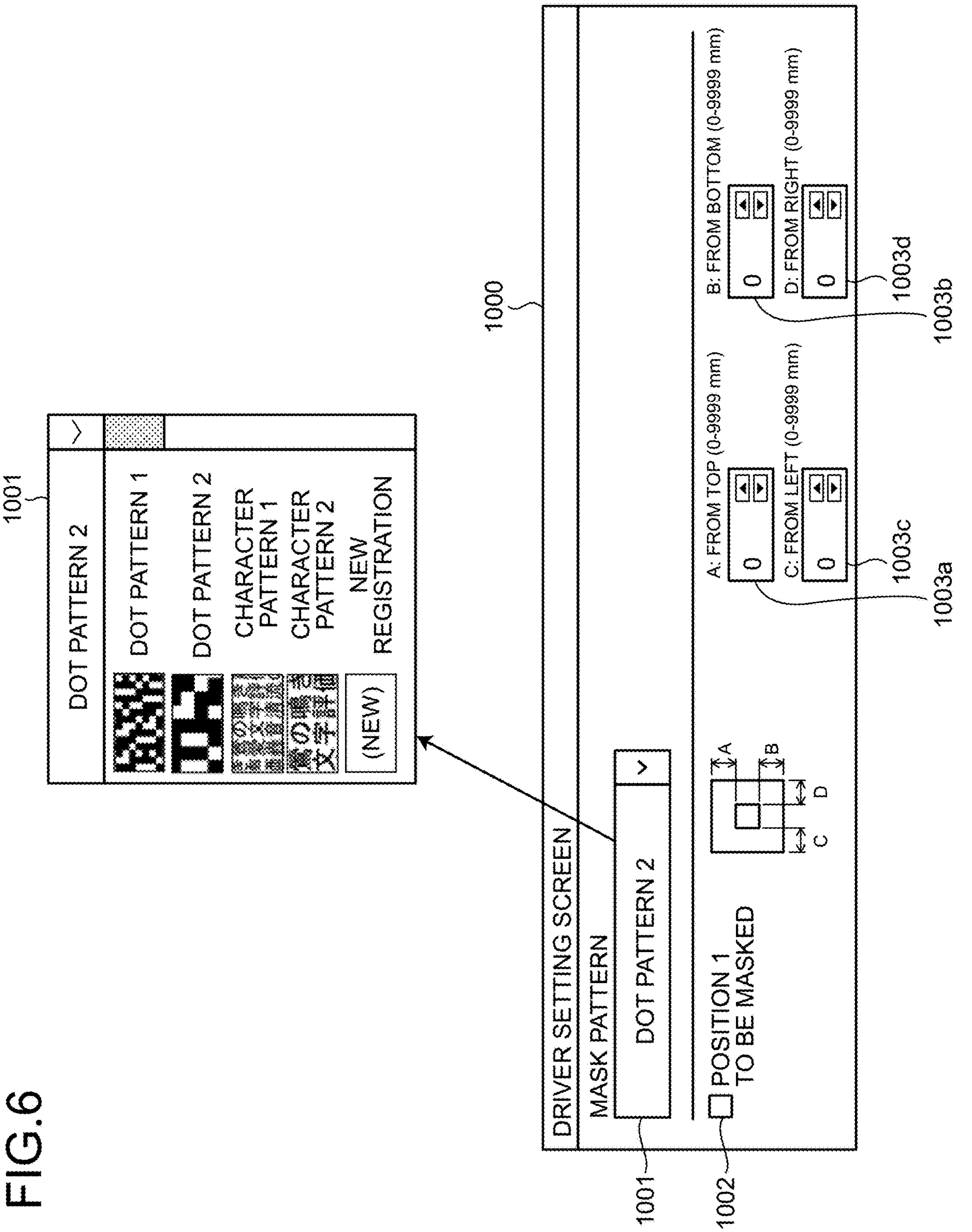
FIG. 6 is a diagram illustrating an example of a driver setting screen in the information processing device according to the embodiment.
Figure 9:
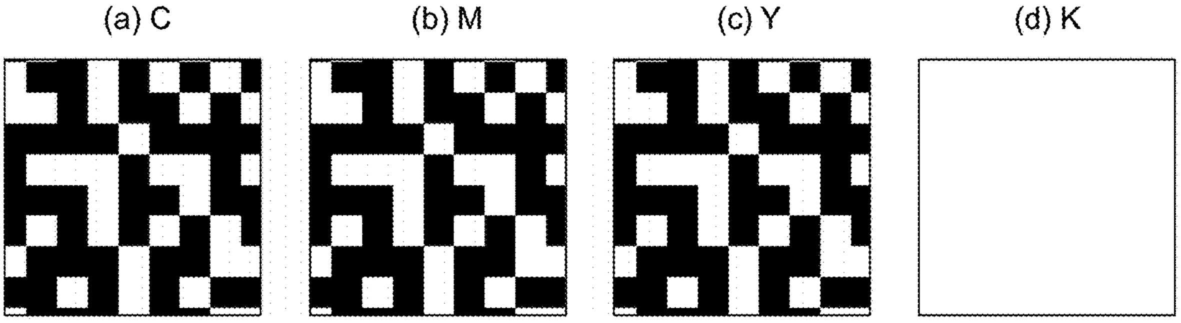
FIG. 9 is a diagram explaining a color configuration of a mask pattern.

FIG. 5 is a diagram illustrating an example of a functional block configuration of the image forming system according to the embodiment. FIG. 6 is a diagram illustrating an example of a driver setting screen in the information processing device according to the embodiment. FIG. 7 is a diagram illustrating an example of area information data. FIG. 8 is a diagram illustrating an example of print data output from the print driver. FIG. 9 is a diagram explaining a color configuration of the mask pattern. The configuration and operations of functional blocks of the image forming system 1 according to the present embodiment will be described with reference to FIGS. 5 to 9.

As illustrated in FIG. 5, the information processing device 10 of the image forming system 1 includes an area specifying unit 101 (specifying unit), a pattern selecting unit 102 (selecting unit), a generating unit 103, a transmitting unit 104, an input unit 105, a display control unit 106, and a memory 107.

In accordance with an operation input to the input unit 105, the area specifying unit 101 is a functional unit configured to specify a hidden area (area of image to be hidden) on which a mask pattern is overlaid in image data (hereinafter, simply referred to as image data) such as a document or an image created by an application installed in the information processing device 10. In other words, when the image data is printed on a printing medium, a black mask pattern formed by overlaying of color toners of C, M, and Y is overlaid and printed on the hidden area specified by the area specifying unit 101. Therefore, the hidden area of the image such as the two-dimensional code such as a QR code and characters for personal information such as a name and an address can be concealed by overlaying a black mask pattern formed by overlaying of color toners of C, M, and Y on the hidden area, and can be read by only the infrared reader.

The area specifying unit 101 is realized by executing a program (print driver) by the CPU 401 illustrated in FIG. 2.

Note that the designation of the hidden area by the area specifying unit 101 may be performed for one area or a plurality of areas. Moreover, the hidden area specified by the area specifying unit 101 may be below referred to as "specified area".

In accordance with an operation input to the input unit 105, the pattern selecting unit 102 is a functional unit configured to select a mask pattern to be overlaid on the hidden area specified by the area specifying unit 101. The pattern selecting unit 102 is realized by executing the program (print driver) by the CPU 401 illustrated in FIG. 2.

Herein, FIG. 6 illustrates a driver setting screen 1000 that is a setting screen of the print driver installed in the information processing device 10. As illustrated in FIG. 6, the driver setting screen 1000 includes a mask pattern selection area 1001, a position checkbox 1002, and position input boxes 1003*a* to 1003*d*.

As illustrated in FIG. 6, the mask pattern selection area 1001 is an area for selecting a pattern from various mask patterns listed in a drop down list. In other words, the pattern selecting unit 102 selects a mask pattern by the selection operation of the mask pattern from the mask pattern selection area 1001 by the input unit 105. Then, the pattern selecting unit 102 includes identification information (number) indicating which of the mask patterns is selected in the area information data illustrated in FIG. 7, and causes the memory 107 to store it.

Note that FIG. 6 illustrates four kinds of mask patterns of dot pattern 1, dot pattern 2, character pattern 1, and character pattern 2 but the present invention is not limited to these mask patterns. Moreover, as illustrated in FIG. 6, a new mask pattern may be newly registered by selecting "New registration" from the drop down list of the mask pattern selection area 1001.

The position checkbox 1002 is a checkbox for selecting the designation of a hidden area where a mask pattern is overlaid. For example, the position checkbox 1002 is checked and the position and range of a specific hidden area is specified by the position input boxes 1003*a* to 1003*d* to be described later, and then the other position checkbox 1002 is displayed and the second and subsequent hidden areas may be specified.

The position input boxes 1003*a* to 1003*d* are input areas for specifying the position and range of a hidden area in the image data where a mask pattern is overlaid. For example, in the example of the driver setting screen 1000 illustrated in FIG. 6, a distance from the top end of the image data is input into the position input box 1003*a*, a distance from the bottom end of the image data is input into the position input box 1003*b*, a distance from the left end of the image data is input into the position input box 1003*c*, and a distance from the right end of the image data is input into the position input box 1003*d*, to be able to specify a rectangular hidden area.

As described above, the area specifying unit 101 specifies a hidden area where a mask pattern is overlaid by an operation to the position checkbox 1002 and the position input boxes 1003*a* to 1003*d* via the input unit 105 by the user. Then, the area specifying unit 101 includes information, indicating which position and range the hidden area is specified at and in, in the area information data illustrated in FIG. 7, and causes the memory 107 to store it. In the example of the area information data illustrated in FIG. 7, positions and ranges of two specified areas and identification information of a mask pattern selected for each specified area are registered.

Note that the present embodiment is not limited to performing an operation of specifying a hidden area by the position input boxes 1003*a* to 1003*d* every time of printing in the driver setting screen 1000, and when area information data is already registered, a hidden area may be specified by selecting the area information data on the driver setting screen 1000.

Based on image data in which the hidden area is specified by the area specifying unit 101 and the mask pattern is selected by the pattern selecting unit 102, the generating unit 103 is a functional unit configured to generate print data to be transmitted to the image forming device 20. In this case, as in the example of print data illustrated in FIG. 8, the generating unit 103 converts the above area information data into a command and generates print data in a format including this command. In other words, the generating unit 103 generates print data for overlaying and printing the mask pattern selected by the pattern selecting unit 102 on the hidden area in the image data specified by the area specifying unit 101. Moreover, the generating unit 103 employs, as a data format of print data, a format such as RPCS (Refined Printing Command Stream) and PCL6 (Printer Command Language 6). The generating unit 103 is realized by executing the program (print driver) by the CPU 401 illustrated in FIG. 2.

The transmitting unit 104 is a functional unit configured to transmit the print data generated by the generating unit 103 to the image forming device 20 via the network I/F 409. The transmitting unit 104 is realized by executing the program (print driver) by the CPU 401 illustrated in FIG. 2.

The input unit 105 is a functional unit configured to accept an operation input of the user. The input unit 105 is realized by the keyboard 411 and the mouse 412 illustrated in FIG. 2.

The display control unit 106 is a functional unit configured to control a display operation of the display 408. In accordance with an operation to the input unit 105 of the user, the display control unit 106 causes the display 408 to display the above driver setting screen 1000, for example. The display control unit 106 is realized by executing the program by the CPU 401 illustrated in FIG. 2.

The memory 107 is a functional unit configured to store the image data created by the application and various data such as the area information data including information of the specified area and the selected mask pattern. The memory 107 is realized by the auxiliary storage device 405 illustrated in FIG. 2.

Note that the functional units of the information processing device 10 illustrated in FIG. 5 conceptually indicate functions and thus are not limited to such the configuration. For example, the plurality of functional units illustrated as independent functional units in the information processing device 10 illustrated in FIG. 5 may be configured as one functional unit. On the other hand, a function of one functional unit in the information processing device 10 illustrated in FIG. 5 may be divided into two or more functions to be configured as a plurality of functional units.

As illustrated in FIG. 5, the image forming device 20 of the image forming system 1 includes a drawing processing unit 201 and a printing unit 202.

The drawing processing unit 201 is a functional unit configured to receive the print data from the information processing device 10 via the network I/F 950 and convert the print data into the drawing data with the printing format in the image forming device 20. At this time, the drawing processing unit 201 converts the print data into the drawing data for overlaying and printing black formed by overlaying the mask pattern indicated by the command with C, M, and Y on the specified area of the print data indicated by the command. In this case, the mask pattern is configured as a pattern of black by overlaying the C-plane pattern of (a) of FIG. 9, the M-plane pattern of (b) of FIG. 9, and the Y-plane pattern of (c) of FIG. 9. Note that the K plane illustrated in (d) of FIG. 9 is not used for printing the mask pattern.

The drawing processing unit 201 is realized by executing the program by the CPU 901 illustrated in FIG. 3.

The printing unit 202 is a functional unit configured to perform printing (image forming) on a printing medium based on the drawing data converted by the drawing processing unit 201. The printing unit 202 is realized by the printer unit 932 illustrated in FIG. 3.

Note that the functional units of the image forming device 20 illustrated in FIG. 5 conceptually indicate functions and thus are not limited to such the configuration. For example, the plurality of functional units illustrated as independent functional units in the image forming device 20 illustrated in FIG. 5 may be configured as one functional unit. On the other hand, a function of one functional unit in the image forming device 20 illustrated in FIG. 5 may be divided into two or more functions to be configured as a plurality of functional units.

Moreover, at least one of the area specifying unit 101, the pattern selecting unit 102, and the generating unit 103 included in the information processing device 10 as described above may be included in the image forming device 20. Moreover, any of the information processing device 10, the image forming device 20, and the image forming system 1 including the information processing device 10 and the image forming device 20 as described above is considered to be included in "the printing system" of the present disclosure.

For Mask Pattern

Figure 10:
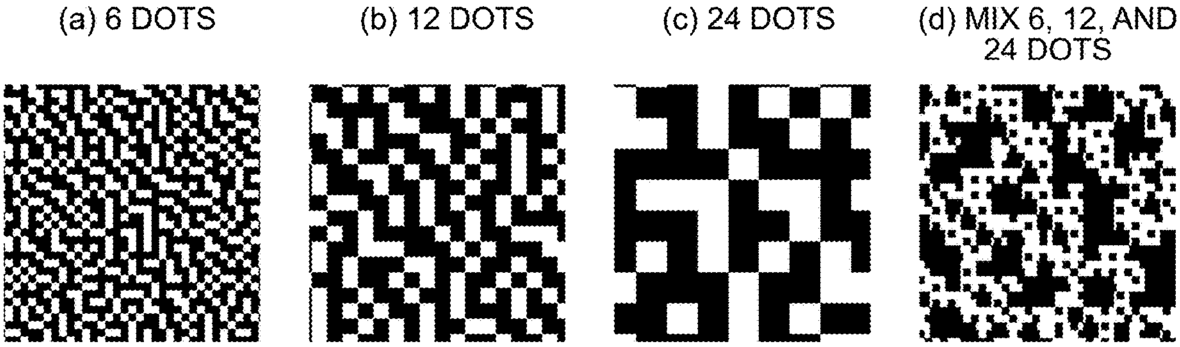
FIG. 10 is a diagram illustrating an example of a dot mask pattern.
Figure 11:
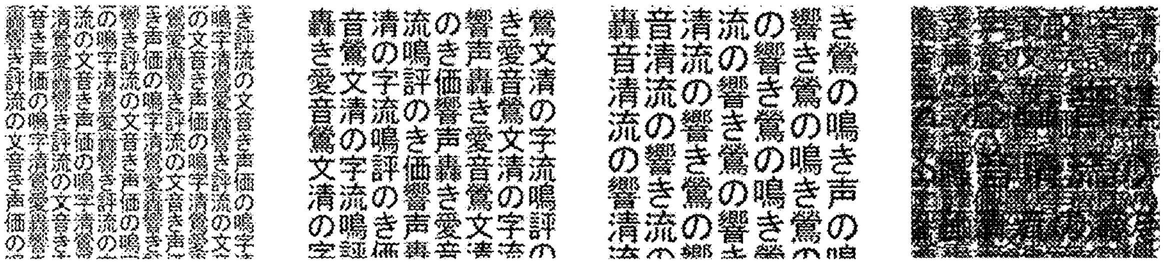
FIG. 11 is a diagram illustrating an example of a character mask pattern.
Figure 12:
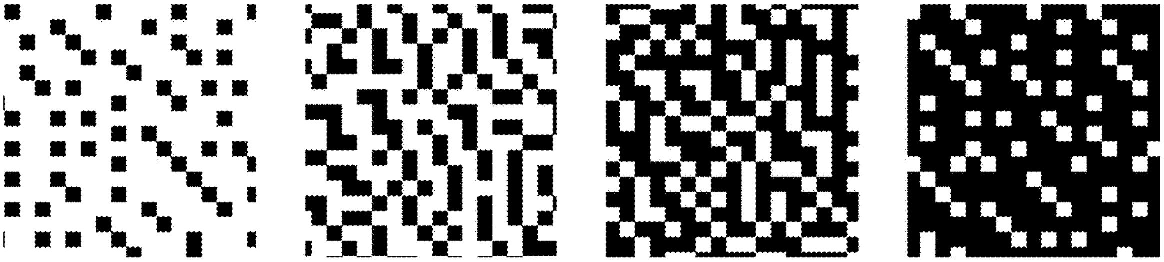
FIG. 12 is a diagram illustrating an example of mask patterns with different printing rates.
Figure 13:
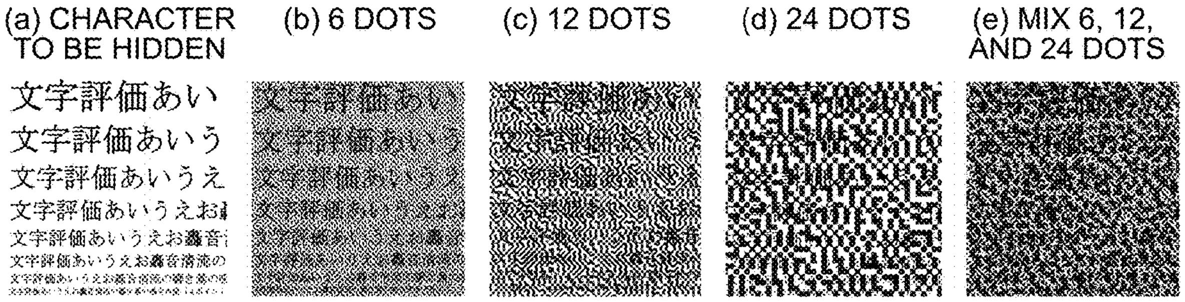
FIG. 13 is a diagram illustrating an example of hiding a character with a dot mask pattern.
Figure 14:
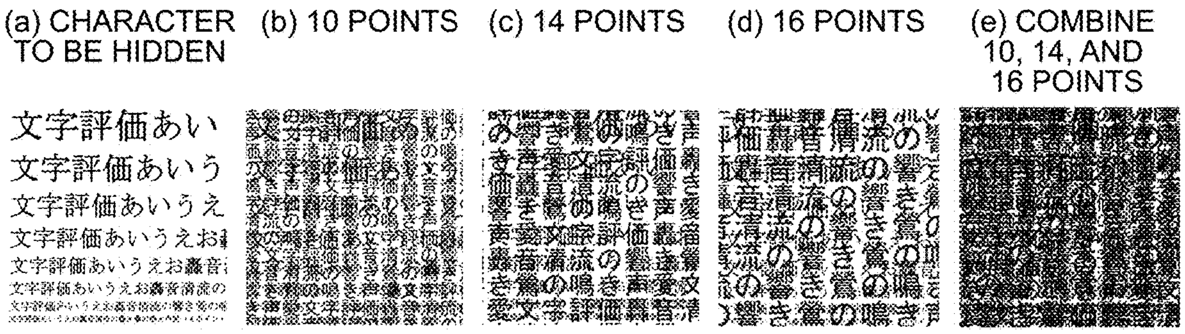
FIG. 14 is a diagram illustrating an example of hiding a character with a character mask pattern.
Figure 15:
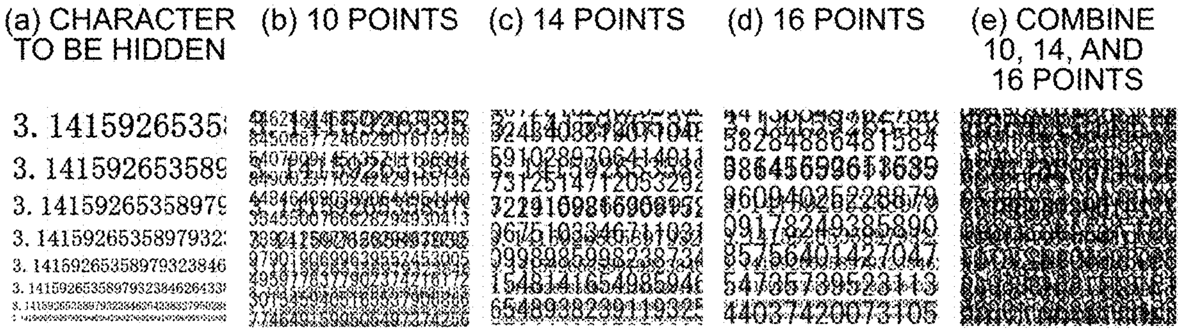
FIG. 15 is a diagram illustrating an example of hiding a numeric character with a numeric mask pattern.
Figure 16:
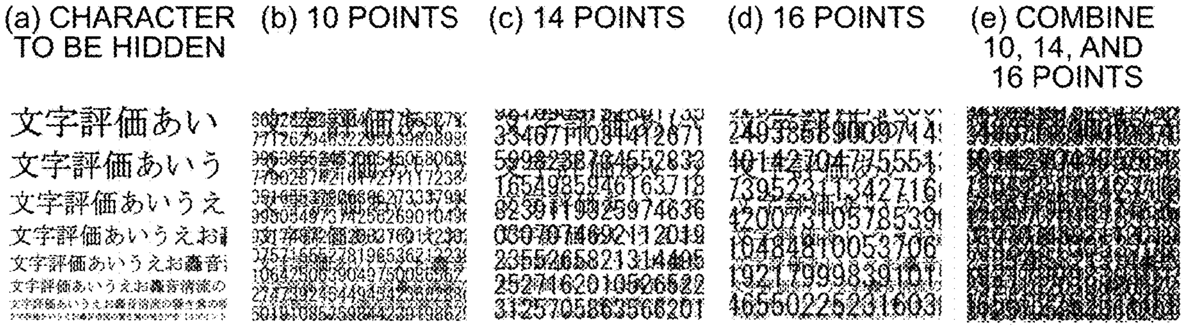
FIG. 16 is a diagram illustrating an example of hiding a character with a numeric mask pattern.

FIG. 10 is a diagram illustrating an example of a dot mask pattern. FIG. 11 is a diagram illustrating an example of a character mask pattern. FIG. 12 is a diagram illustrating an example of mask patterns with different printing rates. FIG. 13 is a diagram illustrating an example of hiding a character with a dot mask pattern. FIG. 14 is a diagram illustrating an example of hiding a character with a character mask pattern. FIG. 15 is a diagram illustrating an example of hiding a numeric character with a numeric mask pattern. FIG. 16 is a diagram illustrating an example of hiding a character with a numeric mask pattern. The mask patterns overlaid and printed on the hidden area specified in the image data will be described with reference to FIGS. 10 to 16.

As described above, because printing is performed with solid toner over the entire print area in the case of the solid image, there are a problem that fixing property of toner is impaired and a problem that the image to be hidden formed of black toner is slightly visible by a subtle difference in characteristics between black by black toner and black formed by overlaying of color toners of C, M, and Y. Therefore, in the present embodiment, like the above pattern image illustrated in FIG. 4, the image to be hidden such as the two-dimensional code such as a QR code and the characters for personal information such as a name and an address is overlaid with the mask pattern such as the dot pattern of black formed by overlaying of color toners of C, M, and Y. Thus, an image to be hidden (concealed) (hereinafter, may be referred to as target image) can be concealed and can be read by the infrared reader.

First, to print the mask pattern to the extent that the fixing property of toner is not impaired, it is desirable that the entire printing rate of the specified area is set to 250% or less, for example. Herein, the entire printing rate means a sum of ratios of toners, of respective toner portions to a predetermined area, to be used when printing. For example, when a ratio of C toner of the C toner portion to the predetermined area is 20% when printing the mask pattern, both ratios of the toner portions of M toner and Y toner that are the other color toners are 20%. Furthermore, a ratio of the image portion to be hidden printed with K toner (black toner) to the predetermined area is 35%. In this case, the entire printing rate has 95% obtained by summing 60% of three color toners (each color toner of 20%) and 35% of K toner of the image to be hidden. Herein, FIG. 12 illustrates an example of a mask pattern according to each printing rate of color toners. Among them, (a) of FIG. 12 illustrates a mask pattern configured of dots when a printing rate is 60% (a single color printing rate of each color toner is 20%). Moreover, (b) of FIG. 12 illustrates a mask pattern configured of dots when a printing rate is 120% (a single color printing rate of each color toner is 40%). Moreover, (c) of FIG. 12 illustrates a mask pattern configured of dots when a printing rate is 180% (a single color printing rate of each color toner is 60%). Moreover, (d) of FIG. 12 illustrates a mask pattern configured of dots when a printing rate is 240% (a single color printing rate of each color toner is 80%). In the case of such the mask patterns, while a pattern having a high printing rate can interfere with looking at the target image, a pattern having a too high printing rate has a property close to the property of the above solid image and thus the target image becomes easier to see.

Note that a printing rate can be adjusted by the size of character or number, the number of times or the interval of overlaying, and the like with a mask pattern configured of characters or numbers as well as a dot mask pattern. For example, FIG. 11 illustrates an example of a mask pattern in which the size of character is changed. Herein, (a) of FIG. 11 illustrates a character mask pattern configured of the 10-point font, (b) of FIG. 11 illustrates a character mask pattern configured of the 14-point font, (c) of FIG. 11 illustrates a character mask pattern configured of the 16-point font, and (d) of FIG. 11 illustrates a character mask pattern configured to overlay and combine characters of 10 points, 14 points, and 16 points of fonts.

Note that setting the entire printing rate of the specified area to 250% or less when printing the mask pattern is desirable for the character mask pattern and the numeric mask pattern illustrated in FIGS. 11 and 14 to 16 as well as the dot mask pattern illustrated in FIG. 12.

Moreover, among the dot mask patterns illustrated in FIG. 10, (a) of FIG. 10 illustrates a mask pattern configured to use the size of 6 dots as a unit, (b) of FIG. 10 illustrates a mask pattern configured to use the size of 12 dots as a unit, (c) of FIG. 10 illustrates a mask pattern configured to use the size of 24 dots as a unit, and FIG. 10 (d) illustrates a mask pattern configured to mix the sizes of 6 dots, 12 dots, and 24 dots. Because the target image becomes easier to see when dots constituting the mask pattern are regularly arranged, it is desirable to use a mask pattern in which dots are randomly arranged (e.g., error diffusion, FM screen, or the like) as illustrated in FIG. 10. Moreover, because the target image including large characters becomes easier to see when dots constituting the mask pattern are too small, it is desirable to use a mask pattern with large dot to hide (conceal) the target image including large characters. On the other hand, because the target image including small characters becomes easier to see when dots constituting the mask pattern are too large, it is desirable to use a mask pattern with small dot to conceal the target image including small characters.

Moreover, in FIG. 13, for the target image including characters illustrated in (a) of FIG. 13, (b) of FIG. 13 illustrates a case hidden with the dot mask pattern configured to use the size of 6 dots as a unit, (c) of FIG. 13 illustrates a case hidden with the dot mask pattern configured to use the size of 12 dots as a unit, (d) of FIG. 13 illustrates a case hidden with the dot mask pattern configured to use the size of 24 dots as a unit, and (e) of FIG. 13 illustrates a case hidden with the dot mask pattern configured to mix the sizes of 6 dots, 12 dots, and 24 dots. Moreover, in FIG. 14, for the target image including characters illustrated in (a) of FIG. 14, (b) of FIG. 14 illustrates a case hidden with a character mask pattern configured of the 10-point font, (c) of FIG. 14 illustrates a case hidden with a character mask pattern configured of the 14-point font, (d) of FIG. 14 illustrates a case hidden with a character mask pattern configured of the 16-point font, and (e) of FIG. 14 illustrates a case hidden with a character mask pattern configured to overlay and combine characters of 10 points, 14 points, and 16 points of fonts. As illustrated in FIGS. 13 and 14, to hide (conceal) the target image including characters, in accordance with the size of character and the type of font, it is effective to change the size of dots constituting the mask pattern or the size of characters or the type of fonts constituting the mask pattern.

Moreover, in FIG. 15, for the target image including numeric characters illustrated in (a) of FIG. 15, (b) of FIG. 15 illustrates a case hidden with a numeric mask pattern configured of the 10-point font, (c) of FIG. 15 illustrates a case hidden with a numeric mask pattern configured of the 14-point font, (d) of FIG. 15 illustrates a case hidden with a numeric mask pattern configured of the 16-point font, and (e) of FIG. 15 illustrates a case hidden with a numeric mask pattern configured to overlay and combine numeric characters of 10 points, 14 points, and 16 points of fonts. Moreover, in FIG. 16, for the target image including characters illustrated in (a) of FIG. 16, (b) of FIG. 16 illustrates a case hidden with a numeric mask pattern configured of the 10-point font, (c) of FIG. 16 illustrates a case hidden with a numeric mask pattern configured of the 14-point font, (d) of FIG. 16 illustrates a case hidden with a numeric mask pattern configured of the 16-point font, and (e) of FIG. 16 illustrates a case hidden with a numeric mask pattern configured to overlay and combine numeric characters of 10 points, 14 points, and 16 points of fonts. As illustrated in FIGS. 14 to 16 described above, it is desirable to hide the target image with a character mask pattern to hide (conceal) the target image including characters, and it is desirable to hide the target image with a numeric mask pattern to hide (conceal) the target image including numeric characters.

Moreover, as illustrated in (e) of FIG. 14, (e) of FIG. 15, and (e) of FIG. 16, it is desirable to hide (conceal) the target image with a mask pattern obtained by overlaying characters or numbers having different sizes. Moreover, it is desirable that characters or numbers included in the target image and characters or numbers constituting the mask pattern have two or more common items among the size, the type of font, the direction, the arrangement, the interval, and the line space.

Moreover, it is desirable that dots, characters, and numbers constituting the mask pattern are formed with black (solid) formed by overlaying of color toners of C, M, and Y without using a half tone.

Note that the mask pattern of the character and number has been described as described above but the same is applied to the mask pattern of a symbol, a graphic, and the like. Moreover, the character and number have been differentially explained as described above, but a numeric character and a symbol are included within a concept of "character".

The user freely selects a mask pattern in accordance with a correlation between the target image and the mask pattern as described above to effectively hide (conceal) the target image.

Flow of Overall Operations of Image Forming System

Figure 17:
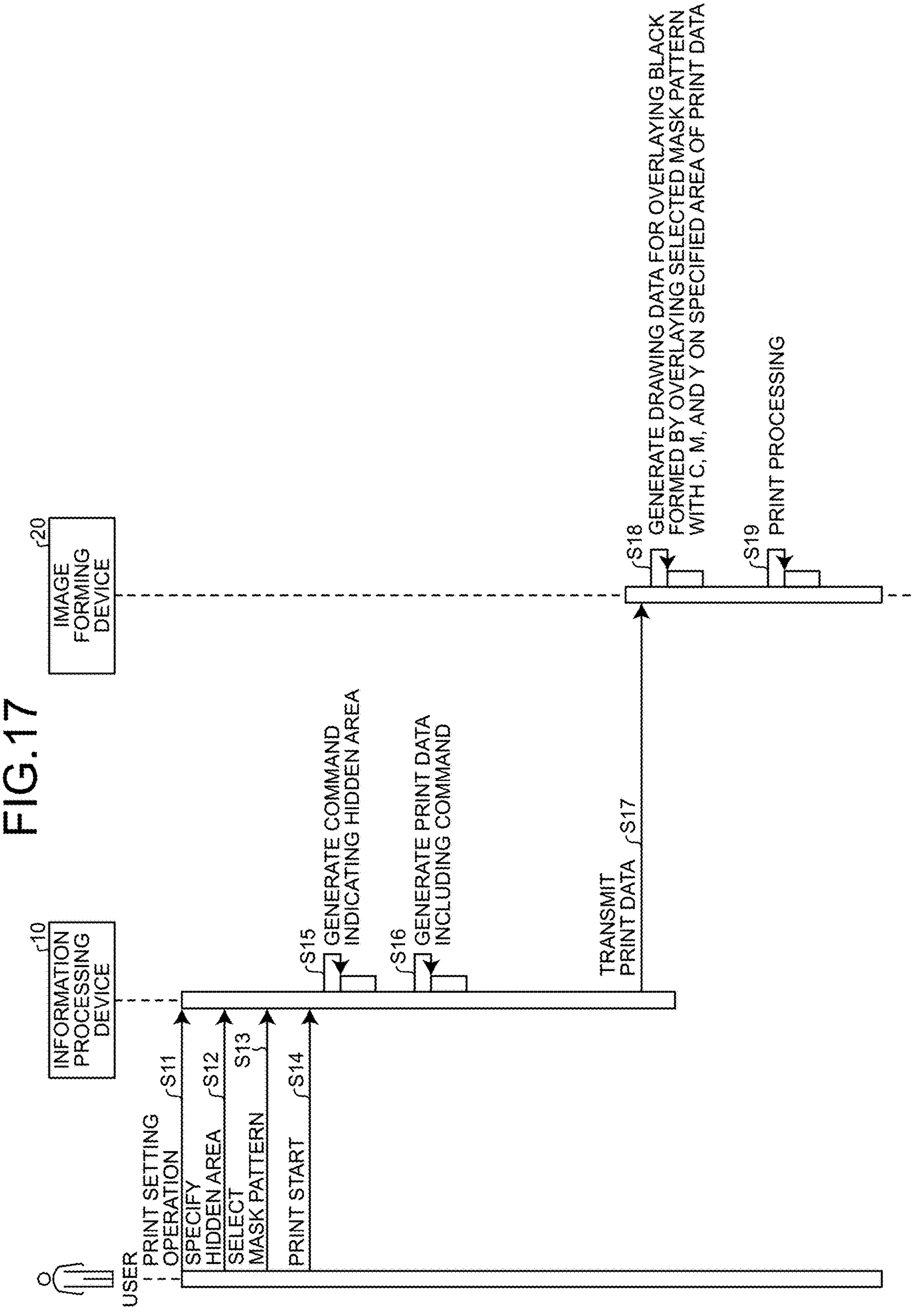
FIG. 17 is a sequence diagram illustrating an example of a flow of overall operations of the image forming system according to the embodiment.

FIG. 17 is a sequence diagram illustrating an example of a flow of overall operations of the image forming system according to the embodiment. The flow of overall operations of the image forming system 1 according to the present embodiment will be described with reference to FIG. 17.

Step S11

In accordance with an operation of the user to the input unit 105, the display control unit 106 of the information processing device 10 causes the display 408 to display the driver setting screen 1000.

Step S12

By an operation of the user to the position checkbox 1002 and the position input boxes **1003*a* to 1003*d* via the input unit 105, the area specifying unit 101 of the information processing device 10 specifies a hidden area (specified area) in image data where a mask pattern is overlaid. Then, the area specifying unit 101 includes information, indicating which position and range the hidden area is specified at and in, in the area information data illustrated in FIG. 7, and causes the memory 107** to store it.

Step S13

By a selection operation of a mask pattern from the mask pattern selection area 1001 by the input unit 105, the pattern selecting unit 102 of the information processing device 10 selects a mask pattern to be overlaid on the hidden area. Then, the pattern selecting unit 102 includes identification information (number) indicating which mask pattern is selected in the area information data illustrated in FIG. 7, and causes the memory 107 to store it.

Step S14

Then, the user executes the print start of the image data by an operation to the input unit 105.

Step S15

The generating unit 103 of the information processing device 10 converts the area information data stored in the memory 107 and generates a command indicating the hidden area.

Step S16

The generating unit 103 generates, from the image data, print data for transmitting to the image forming device 20 in a format including the command.

Step S17

The transmitting unit 104 of the information processing device 10 transmits the print data generated by the generating unit 103 to the image forming device 20 via the network I/F 409.

Step S18

The drawing processing unit 201 of the image forming device 20 receives the print data from the information processing device 10 via the network I/F 950, and converts the print data into drawing data with a print format by the image forming device 20. At this time, the drawing processing unit 201 generates the drawing data for overlaying and printing black formed by overlaying the mask pattern indicated by the command with C, M, and Y on the hidden area (specified area) indicated by the command of the print data.

Step S19

The printing unit 202 of the image forming device 20 performs printing (image forming) on the printing medium based on the drawing data generated by the drawing processing unit 201.

The overall operations of the image forming system 1 are executed by the flow of Steps S11 to S19 described above.

As described above, in the information processing device 10 that causes the electrophotographic image forming device 20 to execute print processing according to the present embodiment, the pattern selecting unit 102 selects a mask pattern representing black by a combination of a plurality of color toners indicating transparency for infrared other than black in accordance with an operation to the input unit 105 to conceal the image area (hidden area) of the target image to be concealed within the image data in an overlaying manner, and the generating unit 103 generates the print data for overlaying and printing the mask pattern selected by the pattern selecting unit 102 on the image area based on the image data. As a result, the present embodiment can hide the image to be hidden by a simple process and can read this image by the infrared reader without requiring complicated image processing.

Moreover, in the information processing device 10 according to the present embodiment, the pattern selecting unit 102 specifies the image area of the target image in accordance with the operation to the input unit 105. As a result, an area desired by the user can be freely specified as an area to be hidden to improve convenience.

Moreover, in the information processing device 10 according to the present embodiment, it is assumed that a sum of a printing rate of color toners for printing the mask pattern of the image area and a printing rate of black toner for printing the target image of the image area is 250% or less. As a result, it is possible to cancel a problem that fixing property of toner is impaired, and to suppress a phenomenon that the image to be hidden formed of black toner is slightly visible by a subtle difference in characteristics between black by black toner and black formed by overlaying of color toners of C, M, and Y.

Note that, in the above embodiment, a program is previously incorporated into ROM etc. and is provided when at least one of the functional units of the information processing device 10 and the image forming device 20 is realized by executing the program. Moreover, in the above embodiment, the program executed by the information processing device 10 and the image forming device 20 may be configured to be recorded and provided in a computer-readable recording medium such as CD-ROM (compact disc read only memory), FD (flexible disk), CD-R (compact disk-recordable), and DVD (digital versatile disc) in an installable or executable format. Moreover, in the above embodiment, the program executed by the information processing device 10 and the image forming device 20 may be configured to be provided by being stored on a computer connected to a network such as the Internet and being downloaded by way of the network. Moreover, in the above embodiment, the program executed by the information processing device 10 and the image forming device 20 may be configured to be provided or distributed by way of a network such as the Internet. Moreover, in the above embodiment, the program executed by the information processing device 10 and the image forming device 20 has a module configuration that includes at least one of the functional units described above, and is configured to load the above functional units on the main storage device to be generated by reading and executing the program from the storage device (e.g., the auxiliary storage device 405, the MEM-P 902, the MEM-C 907, the HD 909, etc.) by the CPU 901 as the actual hardware.

The present invention has an advantage of hiding the image to be hidden by a simple process and reading this image by the infrared reader.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The aspects of the present invention are as follows for example.

<1> An electrophotographic printing system includes:

circuitry configured to:

select, in accordance with an operation to an input device, a mask pattern made up of first toner representing black by a combination of a plurality of color toners, the mask pattern being overlaid on an image area of a target image to be concealed within image data; and generate, based on the image data, print data for overlaying and printing the selected mask pattern on the image area.

<2> The printing system according to <1>, wherein the circuitry is further configured to specify the image area of the target image in accordance with an operation to the input device.

<3> In the printing system according to <1> or <2>, the target image is printed with second toner that is black toner indicating absorption for infrared.

<4> In the printing system according to <3>, a sum of a printing rate of the first toner for printing the mask pattern of the image area and a printing rate of the second toner for printing the target image of the image area is 250% or less.

<5> In the printing system according to any one of <1> to <4>, the circuitry is configured to specify a plurality of the image areas in accordance with the operation to the input device.

<6> In the printing system according to any one of <1> to <5>, the combination of the plurality of color toners includes a combination of cyan toner, magenta toner, and yellow toner.

<7> In the printing system according to any one of <1> to <6>, the target image of the image area on which the mask pattern is printed is capable of be recognized by an infrared reader.

<8> In the printing system according to any one of <1> to <7>, the mask pattern has two or more common items among a size of characters or graphics constituting the target image, a type of font, a direction, an arrangement, an interval, and a line space.

<9> In the printing system according to <8>, the mask pattern includes a mask pattern obtained by overlaying characters having different sizes.

<10> A printing method for an electrophotographic printing system, includes:

selecting, in accordance with an operation to an input device, a mask pattern made up of first toner representing black by a combination of a plurality of color toners, the mask pattern being overlaid on an image area of a target image to be concealed within image data; and generating, based on the image data, print data for overlaying and printing the selected mask pattern on the image area.

<11> A non-transitory computer-readable medium includes programmed instructions that cause a computer mounted on an electrophotographic printing system to execute:

selecting, in accordance with an operation to an input device, a mask pattern made up of first toner representing black by a combination of a plurality of color toners, the mask pattern being overlaid on an image area of a target image to be concealed within image data; and generating, based on the image data, print data for overlaying and printing the selected mask pattern on the image area.

What is claimed is:

1. An electrophotographic printing system comprising:

circuitry configured to:

select, in accordance with an operation to an input device, a mask pattern made up of first toner representing black by a combination of a plurality of color toners, the mask pattern being overlaid on an image area of a target image to be concealed within image data; and generate, based on the image data, print data for overlaying and printing the selected mask pattern on the image area.

2. The printing system according to claim 1, wherein the circuitry is further configured to specify the image area of the target image in accordance with an operation to the input device.

3. The printing system according to claim 2, wherein the circuitry is configured to specify a plurality of the image areas in accordance with the operation to the input device.

4. The printing system according to claim 1, wherein the target image is printed with second toner that is black toner indicating absorption for infrared.

5. The printing system according to claim 4, wherein a sum of a printing rate of the first toner for printing the mask pattern of the image area and a printing rate of the second toner for printing the target image of the image area is 250% or less.

6. The printing system according to claim 1, wherein the combination of the plurality of color toners includes a combination of cyan toner, magenta toner, and yellow toner.

7. The printing system according to claim 1, wherein the target image of the image area on which the mask pattern is printed is capable of be recognized by an infrared reader.

8. The printing system according to claim 1, wherein the mask pattern has two or more common items among a size of characters or graphics constituting the target image, a type of font, a direction, an arrangement, an interval, and a line space.

9. The printing system according to claim 8, wherein the mask pattern includes a mask pattern obtained by overlaying characters having different sizes.

10. A printing method for an electrophotographic printing system, the method comprising:

selecting, in accordance with an operation to an input device, a mask pattern made up of first toner representing black by a combination of a plurality of color toners, the mask pattern being overlaid on an image area of a target image to be concealed within image data; and generating, based on the image data, print data for overlaying and printing the selected mask pattern on the image area.

11. A non-transitory computer-readable medium including programmed instructions that cause a computer mounted on an electrophotographic printing system to execute:

selecting, in accordance with an operation to an input device, a mask pattern made up of first toner representing black by a combination of a plurality of color toners, the mask pattern being overlaid on an image area of a target image to be concealed within image data; and generating, based on the image data, print data for overlaying and printing the selected mask pattern on the image area.

* * * * *